United States Patent
McCaffrey

(10) Patent No.: US 10,443,421 B2
(45) Date of Patent: Oct. 15, 2019

(54) TURBOMACHINE BLADE ASSEMBLIES

(71) Applicant: UNITED TECHNOLOGIES CORPORATION, Farmington, CT (US)

(72) Inventor: Michael G. McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 881 days.

(21) Appl. No.: 14/803,897

(22) Filed: Jul. 20, 2015

(65) Prior Publication Data

US 2016/0047260 A1    Feb. 18, 2016

Related U.S. Application Data

(60) Provisional application No. 62/029,627, filed on Aug. 13, 2014.

(51) Int. Cl.
| | | |
|---|---|---|
| F01D 11/00 | (2006.01) | |
| F01D 5/30 | (2006.01) | |
| F01D 5/22 | (2006.01) | |
| F01D 5/14 | (2006.01) | |

(52) U.S. Cl.
CPC ............ *F01D 11/006* (2013.01); *F01D 5/147* (2013.01); *F01D 5/22* (2013.01); *F01D 5/30* (2013.01); *F01D 5/303* (2013.01); *F01D 5/3007* (2013.01); *F05D 2220/30* (2013.01); *F05D 2240/55* (2013.01); *F05D 2240/57* (2013.01); *F05D 2250/30* (2013.01); *F05D 2250/70* (2013.01); *Y02T 50/672* (2013.01)

(58) Field of Classification Search
CPC .......... F01D 11/006; F01D 5/147; F01D 5/22; F01D 5/30; F01D 5/3007; F01D 5/303; F05D 2220/30; F05D 2240/55; F05D 2240/57; F05D 2250/30; F05D 2250/70; Y02T 50/672
See application file for complete search history.

(56) References Cited

U.S. PATENT DOCUMENTS

| | | | |
|---|---|---|---|
| 2,916,257 A | 12/1959 | Poellmitz et al. | |
| 6,273,683 B1 * | 8/2001 | Zagar | F01D 5/22 277/421 |
| 6,561,764 B1 | 5/2003 | Tiemann | |

(Continued)

FOREIGN PATENT DOCUMENTS

| | | |
|---|---|---|
| EP | 1167691 A2 | 1/2002 |
| EP | 2233696 A2 | 9/2010 |
| WO | 2013188731 A1 | 12/2013 |

OTHER PUBLICATIONS

European Search Report for Application No. 15175919.8-1610; dated Jan. 7, 2016; 9 pgs.

(Continued)

*Primary Examiner* — David E Sosnowski
*Assistant Examiner* — Erica J Zamora Alvarez
(74) *Attorney, Agent, or Firm* — Cantor Colburn LLP

(57) ABSTRACT

A turbomachine blade can include a blade root defining a plurality of feather seal slots on a lateral portion thereof. The plurality of seal slots includes two leg slots, each leg slot extending radially, and a cross member slot extending axially. An airfoil portion extends radially from the blade root.

16 Claims, 5 Drawing Sheets

(56) References Cited

U.S. PATENT DOCUMENTS

| | | | |
|---|---|---|---|
| 7,762,780 B2* | 7/2010 | Decardenas | F01D 5/147 |
| | | | 416/193 A |
| 8,573,942 B2* | 11/2013 | Strohl | F01D 5/3007 |
| | | | 416/219 R |
| 2009/0053045 A1 | 2/2009 | Nowak et al. | |
| 2010/0150710 A1 | 6/2010 | Khanin et al. | |
| 2012/0049467 A1* | 3/2012 | Stewart | F01D 5/22 |
| | | | 277/641 |
| 2012/0114480 A1 | 5/2012 | Amaral et al. | |
| 2012/0121423 A1* | 5/2012 | Honkomp | F01D 11/006 |
| | | | 416/190 |
| 2012/0237352 A1* | 9/2012 | Boyer | F01D 5/22 |
| | | | 416/221 |
| 2015/0167480 A1* | 6/2015 | Pearson | F01D 5/22 |
| | | | 416/193 A |

OTHER PUBLICATIONS

EP Office Action for Application No. 15 175 919; dated Mar. 22, 2019.

\* cited by examiner

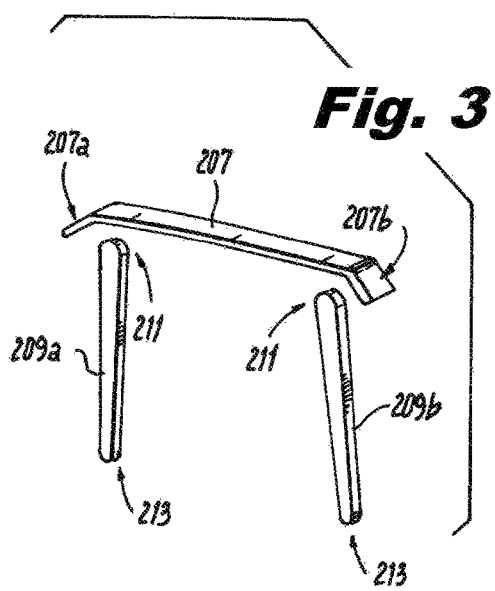
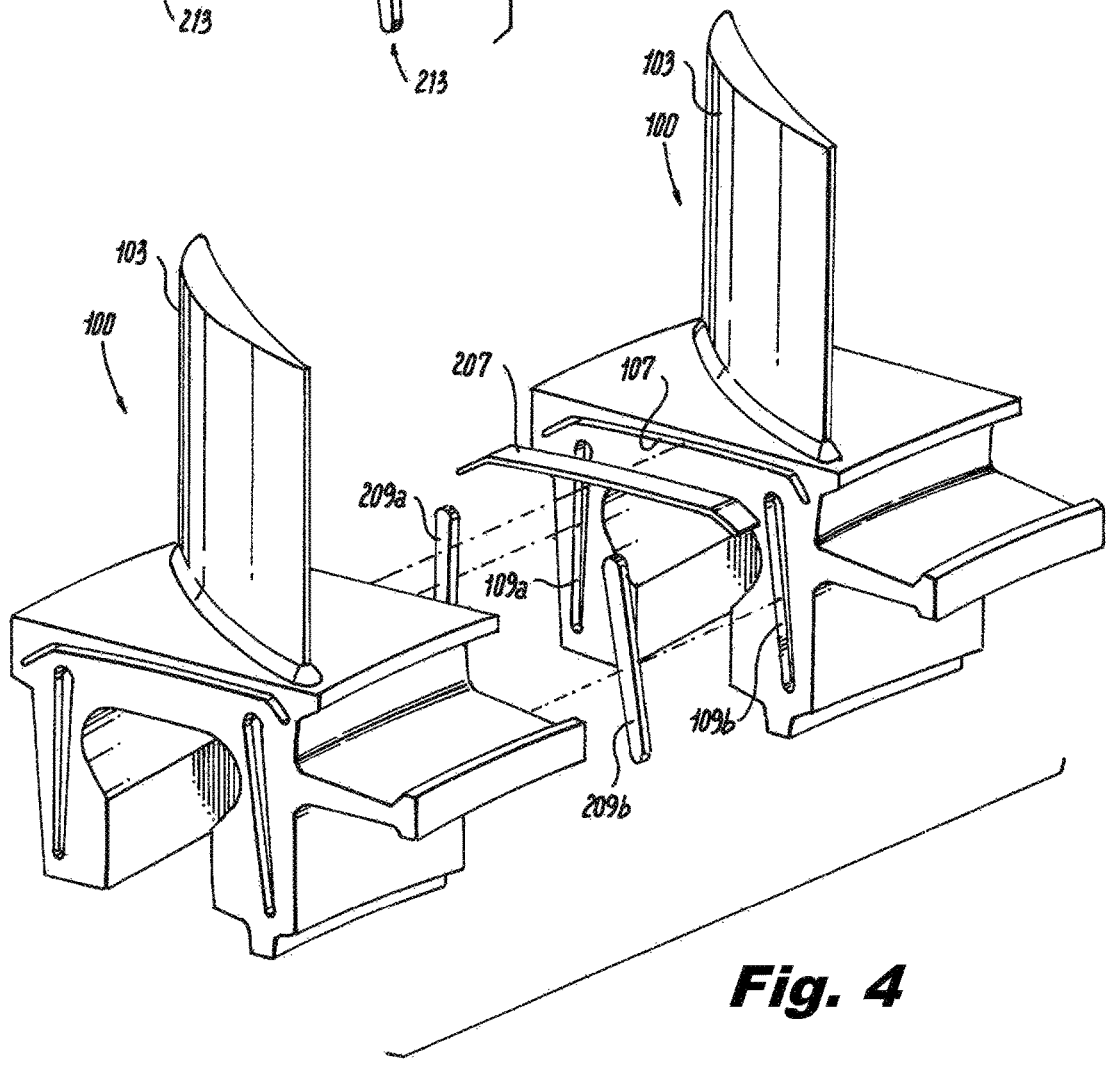

TURBOMACHINE BLADE ASSEMBLIES

CROSS-REFERENCE TO RELATED APPLICATION

This application claims the benefit of priority under 35 U.S.C. § 119(e) to U.S. Provisional Application No. 62/029,627, filing date Aug. 13, 2014, which is incorporated herein by reference in its entirety.

BACKGROUND

1. Field

The present disclosure relates to turbomachines, more specifically to turbomachine blade assemblies and seals therefor.

2. Description of Related Art

Feather seals have been used in turbomachines to seal the gas path between adjacent turbomachine blade assemblies on a single rotor. Traditionally, blade roots have included U-shaped feather seal slots for receiving U-shaped feather seals, the U-shape opening radially inward. However, under the forces of operation (e.g., stress due to the fast rotational motion of the rotor), the U-shape feather seals can buckle in on themselves due to the force of the legs of the U-shape pressing up against the cross-portion connecting the two legs of the U-shape. This deformation leads to leaking between the forward and aft portions of the blade stage, reducing the efficiency of the system.

Such conventional methods and systems have generally been considered satisfactory for their intended purpose. However, there is still a need in the art for improved feather seals. The present disclosure provides a solution for this need.

SUMMARY

In at least one aspect of this disclosure, a turbomachine blade includes a blade root defining a plurality of feather seal slots on a lateral portion thereof. The plurality of seal slots includes two leg slots, each leg slot extending radially, and a cross member slot extending axially. An airfoil portion extends radially from the blade root.

One of the leg slots can be a forward leg slot and the other can be an aft leg slot such that the forward leg slot is positioned axially forward of the aft leg slot. The cross member slot can extend axially forward beyond the forward leg slot and aft of the aft leg slot. The cross member slot can include a forward bend at least partially extending around an end of the forward leg slot. The cross member slot can include an aft bend at least partially extending around an end of the aft leg slot.

The cross member slot can be separate from each of the leg slots and can be in proximity to an end of each of the leg slots. The cross member slot can be radially outboard of the leg slots. In some embodiments, the cross member slot can be defined in between the leg slots. Each leg slot can have variable thickness such that the thickness of the leg slot increases from a radially inward end to a radially outward end thereof.

A turbomachine blade assembly can include at least two blades as described above assembled adjacent each other and defining a gap therebetween. The blade assembly further includes three feather seals including a cross member seal and two leg seals, each feather seal seated in a respective one of the slots for sealing the gap.

One of the leg seals can be a forward leg seal and the other can be an aft leg seal such that the forward leg seal is positioned axially forward of the aft leg seals. The cross member seal can extend axially forward beyond the forward leg seal and aft of the aft leg seal.

The cross member seal can include a forward bend at least partially extending around an end of the forward leg seal. The cross member seal can include an aft bend at least partially extending around an end of the aft leg seal.

The cross member seal can be separate from each of the leg seals and in proximity to an end of each of the leg seals. The cross member seal can be positioned radially outboard of the leg seal. In some embodiments, the cross member seal can be disposed between the leg slots. Each leg seal can have a variable thickness such that the thickness of the leg seal increases from a radially inward end to a radially outward end thereof.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 3 is a schematic perspective view of an embodiment of three feather seals configured to mate with the feather seal slots shown in FIG. 2;

FIG. 4 is an exploded perspective view of the assembly of FIG. 2, showing feather seals disposed between the blades of the turbomachine blade assembly;

DETAILED DESCRIPTION

Figure 1:
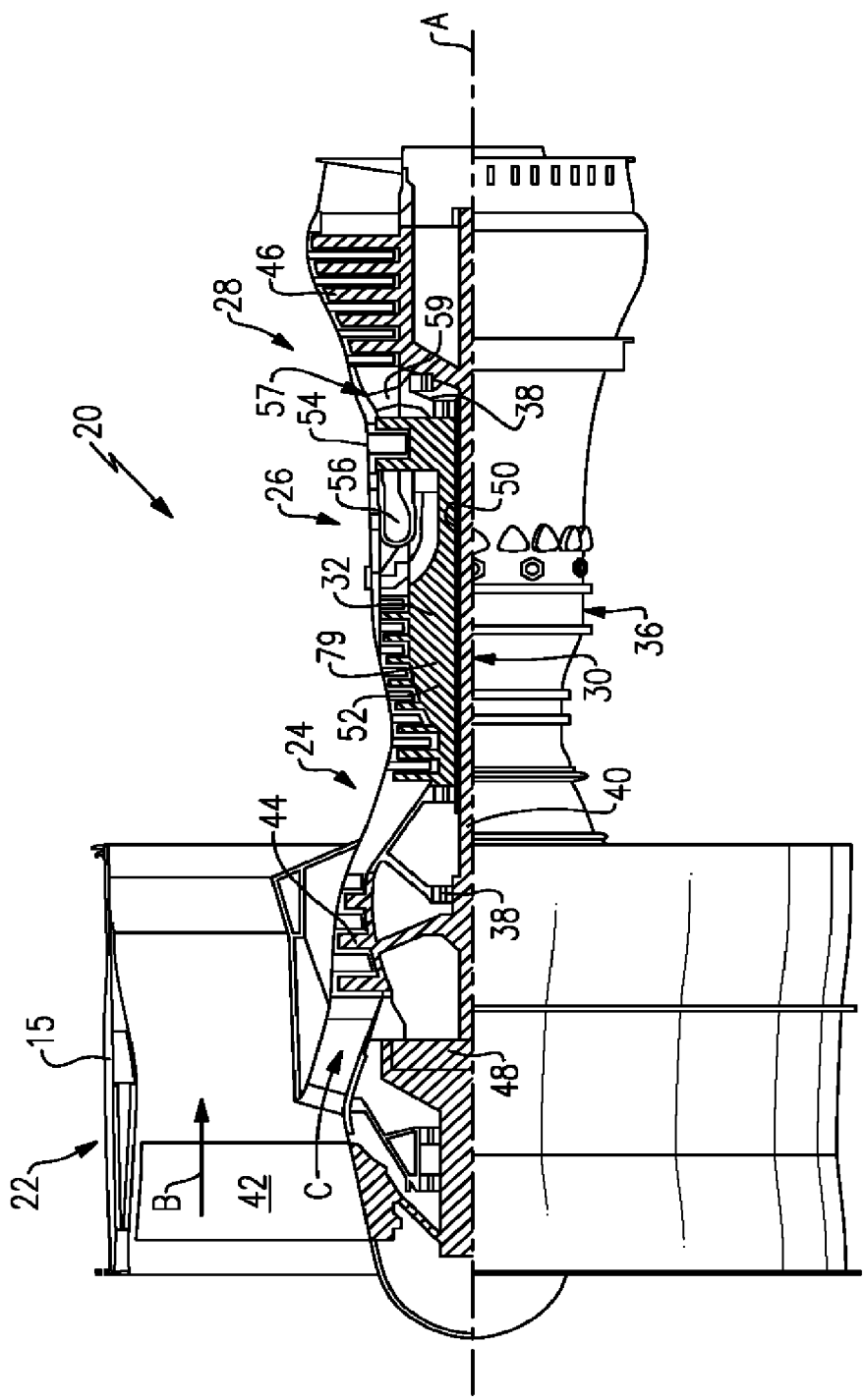
FIG. 1 is a schematic view of an embodiment of a turbomachine in accordance with this disclosure.

Reference will now be made to the drawings wherein like reference numerals identify similar structural features or aspects of the subject disclosure. For purposes of explanation and illustration, and not limitation, an illustrative view of an embodiment of a turbomachine blade assembly in accordance with the disclosure is shown in FIG. 2 and is designated generally by reference character 100a. Other aspects and/or embodiments of this disclosure are shown in FIGS. 1 and 3-6. The systems and methods described herein can be used to seal a gap between blades 100 of the turbomachine blade assembly 100a.

Figure 2:
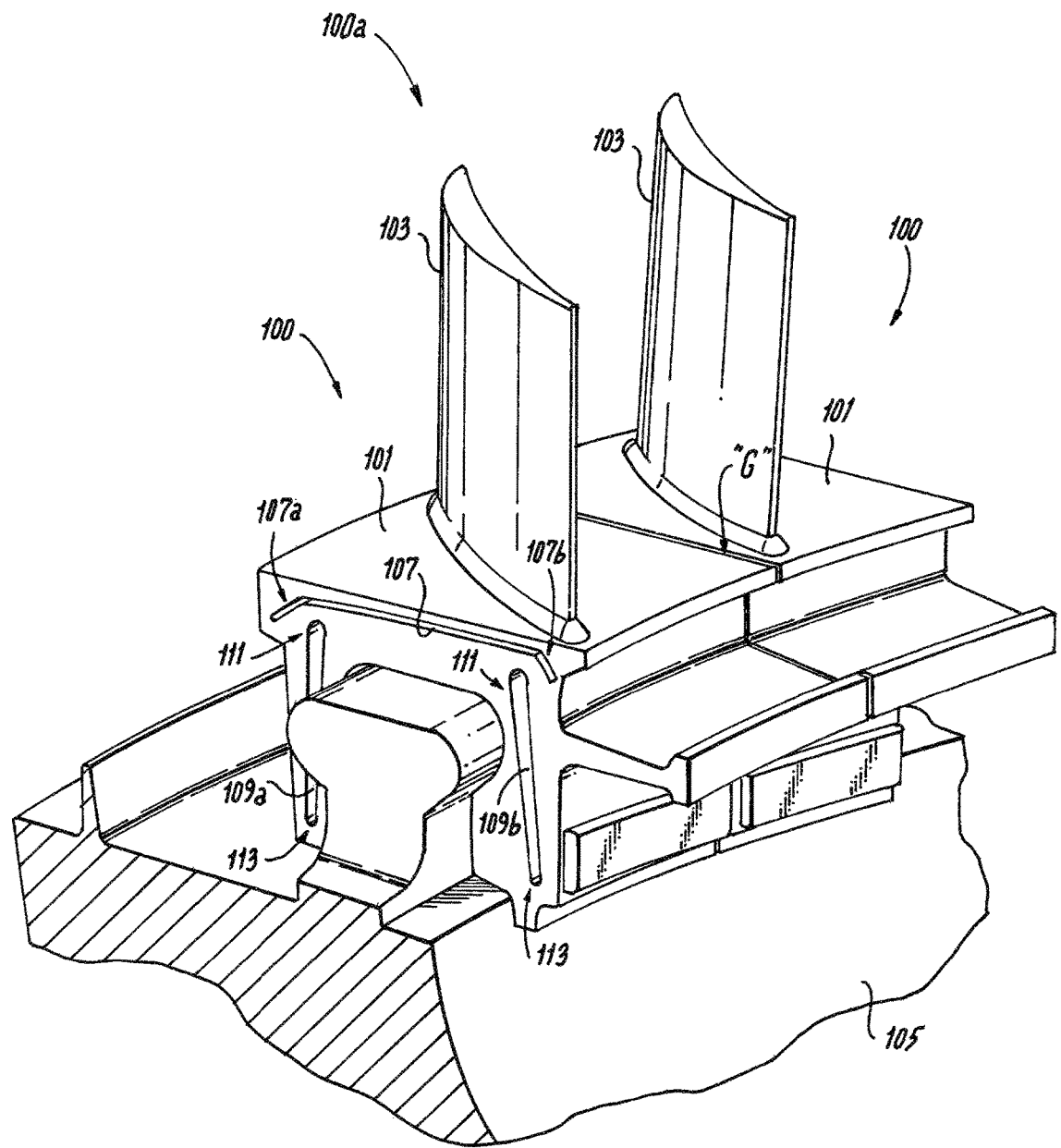
FIG. 2 is a perspective view of an embodiment of a turbomachine blade assembly in accordance with this disclosure, showing feather seal slots defined in a blade root of a turbomachine blade.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 meters/second).

Referring to FIGS. 2 and 4, in at least one aspect of this disclosure, a turbomachine blade 100 includes a blade root 101 defining a plurality of feather seal slots on a lateral portion thereof. Each blade 100 also includes an airfoil portion 103 extending radially from the blade root 101. The blade root 101 is configured to connect to a rotor 105, e.g., by including a dove-tail style slot defined therein. The blade 100 and any portion thereof can be made of any suitable material or combination thereof (e.g., metal, ceramic). The blade 100 can be used in any suitable portion of a turbomachine (e.g., a compressor or turbine portion of gas turbine engine 20).

The plurality of seal slots include two leg slots 109a, 109b, each leg slot 109a, 109b extending radially. One of the leg slots is a forward leg slot 109a and the other is an aft leg slot 109b such that the forward leg slot 109a is positioned axially forward of the aft leg slot 109b.

The seal slots also include a cross member slot 107 extending axially. In some embodiments, the cross member slot 107 can extend axially forward beyond the forward leg slot 109a and aft of the aft leg slot 109b as shown in FIG. 2. The cross member slot 107 can include a forward bend 107a at least partially extending around a radially outward end 111 of the forward leg slot 109a. The cross member slot 107 can also or alternatively include an aft bend 107b at least partially extending around a radially outward end 111 of the aft leg slot 109b.

Figure 5:
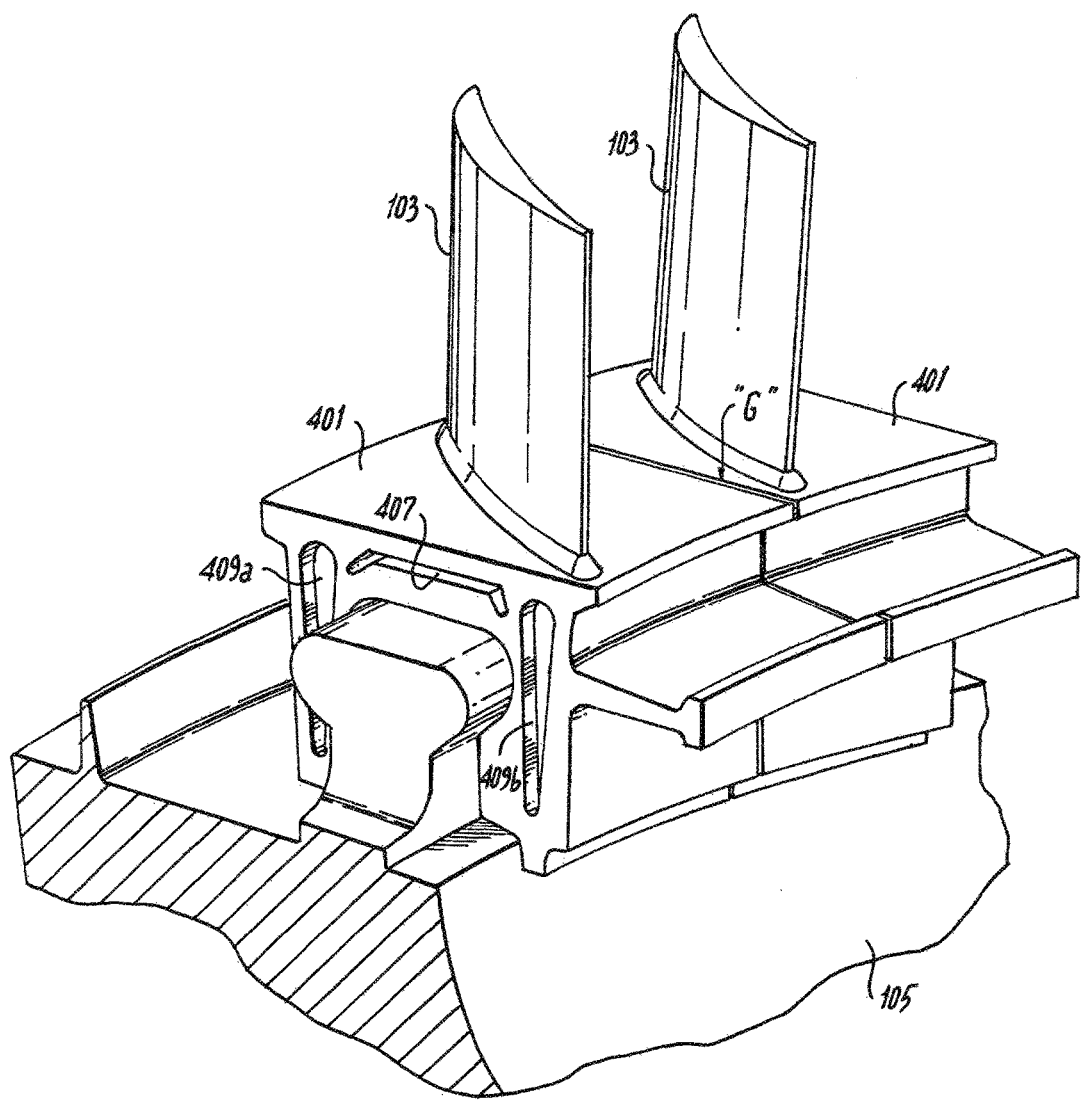
FIG. 5 is a perspective view of another embodiment of a turbomachine blade assembly in accordance with this disclosure, showing feather seal slots defined in a blade root of a turbomachine blade where the function slot is between the leg slots.

As shown, the cross member slot 107 can be separate from each of the leg slots 109a, 109b and is in proximity to an end 111 of each of the leg slots 109a, 109b. The feather seal slots can be defined in a way such that the slots straddle the dove tail portion of the blade root 101. In some embodiments, the cross member slot 107 can be radially outboard of the leg slots 109a, 109b as shown in FIG. 2. Referring to FIG. 5, in other embodiments, the cross member slot 407 can be defined in between the leg slots 409a, 409b in the blade root 401.

Referring back to FIGS. 2 and 4, each leg slot 109a, 109b can have variable thickness such that the thickness of each leg slot 109a, 109b increases from a radially inward end 113 to a radially outward end 111 thereof. Any other suitable shape or arrangement for the leg slots 109a, 109b and/or the cross member slot 107 is contemplated herein.

When two or more blades 100 are positioned on a rotor 105 adjacent each other, a small gap "G" exists therebetween. Referring to FIGS. 3 and 4, the blade assembly 100a further includes three feather seals including a cross member seal 207 and two leg seals 209a, 109b. As shown in FIG. 4, each feather seal can be seated in a respective one of the slots 107, 109a, 109b for sealing the gap "G".

The forward leg seal 209a is positioned axially forward of the aft leg seal 109b. In some embodiments, the cross member seal 207 can extend axially forward beyond the forward leg seal 209a and aft of the aft leg seal 209b.

The cross member seal 207 can include a forward bend 207a at least partially extending around an end 211 of the forward leg seal 209a. Alternatively or conjunctively, the cross member seal 207 can include an aft bend 207b at least partially extending around an end 211 of the aft leg seal 209b. As shown, the cross member seal 207 can be separate from each of the leg seals 209a, 209b and in proximity to an end 211 of each of the leg seals 209a, 209b.

The cross member seal 207 can be positioned radially outboard of the leg seals 209a, 209b as shown in FIGS. 3 and 4. In other embodiments, the cross member seal 207 can be disposed between the leg seals 209a, 209b (e.g., as for the embodiment shown in FIG. 5). In some embodiments, the closest distance between the leg seals 209a, 209b and the cross member seal 207 can be about 0.02 inches (about 0.5 mm) to about 0.04 inches (about 1 mm).

Each leg seal 209a, 209b can have a variable thickness such that the thickness of the leg seal 209a, 209b increases from a radially inward end 213 to a radially outward end 211 thereof. Any other suitable shape or arrangement for the leg seals 209a, 209b and/or the cross member seal 207 is contemplated herein. The seals 207, 209a, 209b can include any suitable material, including, but not limited to, nickel, titanium, CMC (Ceramic Matrix Composite), and/or ceramic.

By arranging the leg seals 209a, 209b separate from the cross member seal 207, the leg seals 209a, 209b cannot cause buckling of the cross member seal 207. Providing the forward bend 207a and/or the aft bend 207b allows for a closer, tighter seal between the cross member seal 207 and the leg seals 209a, 209b.

Moreover, thickening the leg seals 209a, 209b at a radially outward end 211 allows a greater force absorption in rotation such that the leg seals 209a, 209b resist distortion due to compression from the forces of rotation. Such a thickening can allow for the use of lighter, less dense material, making up for the increase thickness without increasing weight.

Figure 6:
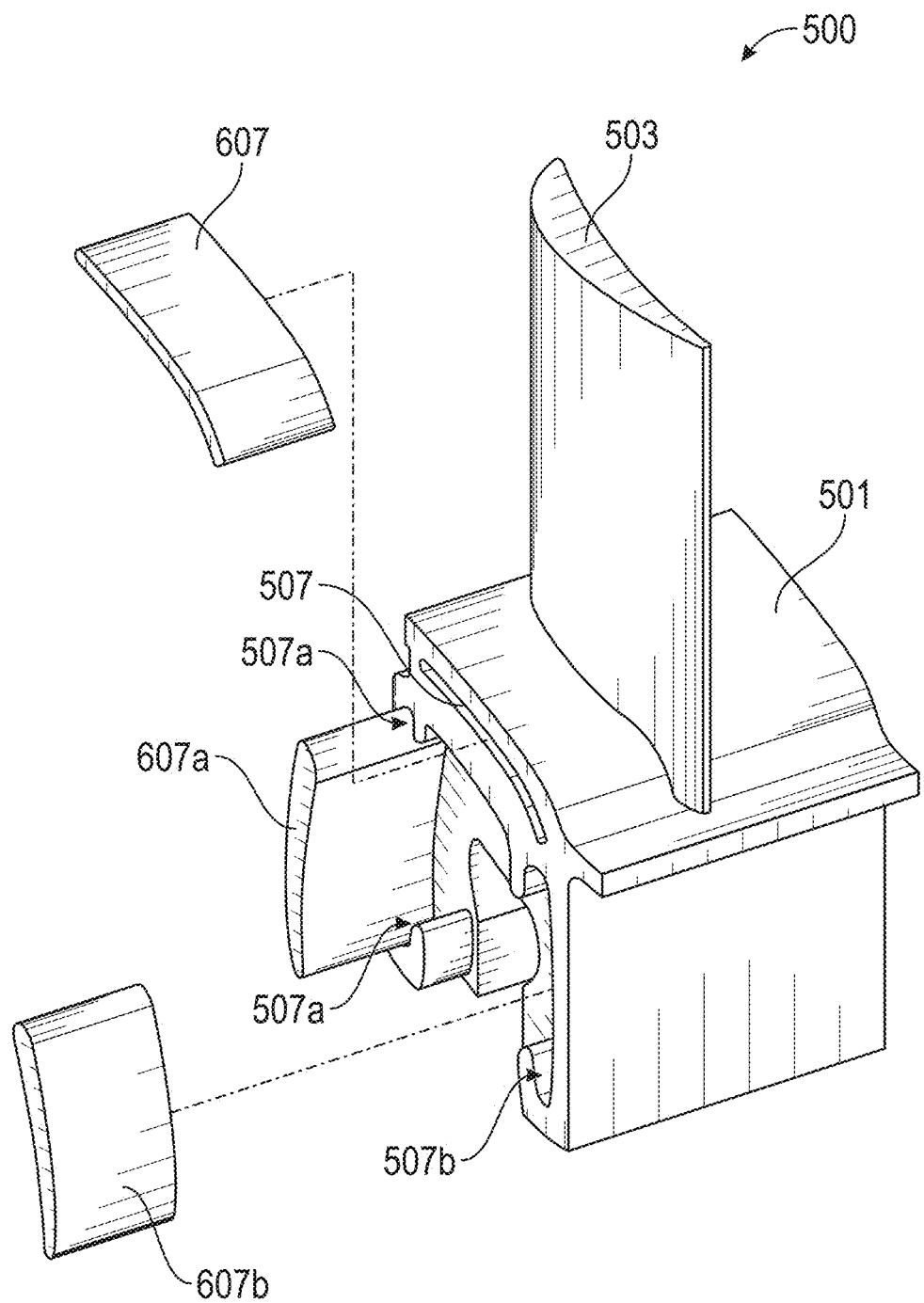
FIG. 6 is a perspective view of another embodiment of a turbomachine blade assembly in accordance with this disclosure, showing feather seal slots defined in a blade root of a turbomachine blade.

Referring to FIG. 6, another embodiment of a turbomachine blade 500 is shown including a blade root 501 defining a plurality of feather seal slots on a lateral portion thereof. Each blade 500 also includes an airfoil portion 503 extending radially from the blade root 501. The blade root 501 is configured to connect to a rotor, e.g., by including a dove-tail style slot defined therein. The blade 500 and any portion thereof can be made of any suitable material or combination thereof (e.g., metal, ceramic). As shown, the blade 500 can be configured for use as a turbine blade in the turbine portion of a turbomachine.

The plurality of seal slots include two leg slots 507a, 507b similar to leg slots 109a, 109b described above configured to accept corresponding leg seals 607a, 607b. However, seal slots 507a, 507b differ from the embodiment shown in FIG. 2 in that seal slots 507a, 507b are not fully enclosed. The seal slots also include a cross member slot 507 extending axially similar to the cross-member slot 107 described above configured to accept corresponding cross-member seal 607.

The methods and systems of the present disclosure, as described above and shown in the drawings, provide for turbomachine seals with superior properties including improved resistance to deformation and failure. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A turbomachine blade, comprising:
    a blade root having a dove-tail slot defined therein;
    a plurality of feather seal slots on a lateral portion of the blade root, the plurality of feather seal slots being defined to straddle the dove-tail slot and comprise two leg slots, each leg slot extending radially with respect to the blade root, and a cross member slot extending axially with respect to the blade root, wherein the cross member slot is separate from each of the leg slots and is in proximity to a radial outward end of each of the leg slots, and wherein the plurality of feather seal slots are not fully enclosed; and
    an airfoil portion extending radially from the blade root.

2. The blade of claim 1, wherein one of the leg slots is a forward leg slot and the other is an aft leg slot such that the forward leg slot is positioned axially forward of the aft leg slot.

3. The blade of claim 2, wherein the cross member slot extends axially forward beyond the forward leg slot and aft of the aft leg slot.

4. The blade of claim 2, wherein the cross member slot includes a forward bend at least partially extending around the radial outward end of the forward leg slot.

5. The blade of claim 2, wherein the cross member slot includes an aft bend at least partially extending around the radial outward end of the aft leg slot.

6. The blade of claim 1, wherein the cross member slot is radially outboard of the leg slots.

7. The blade of claim 1, wherein each leg slot has a variable thickness such that the thickness of the leg slot increases from a radially inward end to the radially outward end thereof.

8. The blade of claim 1, wherein the cross member slot is defined in between the leg slots.

9. A turbomachine blade assembly, comprising:
    at least two turbomachine blades assembled adjacent each other and defining a gap therebetween, each blade assembly including:
    a blade root having a dove-tail slot defined therein;
    a plurality of feather seal slots on a lateral portion of the blade root, the plurality of feather seal slots being defined to straddle the dove-tail slot and comprise two leg slots, each leg slot extending radially with respect to the blade root, and a cross member slot extending axially with respect to the blade root, wherein the cross member slot is separate from each of the leg slots and is in proximity to a radial outward end of each of the leg slots, and wherein the plurality of feather seal slots are not fully enclosed; and an airfoil portion extending radially from the blade root; and three feather seals including a cross member seal and two leg seals, each feather seal seated in a respective one of the slots for sealing the gap.

10. The blade assembly of claim 9, wherein one of the leg seals is a forward leg seal and the other is an aft leg seal such that the forward leg seal is positioned axially forward of the aft leg seal.

11. The blade assembly of claim 10, wherein the cross member seal extends axially forward beyond the forward leg seal and aft of the aft leg seal.

12. The blade assembly of claim 10, wherein the cross member seal includes a forward bend at least partially extending around an end of the forward leg seal.

13. The blade assembly of claim 10, wherein the cross member seal includes an aft bend at least partially extending around an end of the aft leg seal.

14. The blade assembly of claim 9, wherein the cross member seal is radially outboard of the leg seals.

15. The blade assembly of claim 9, wherein each leg seal has a variable thickness such that the thickness of the leg seal increases from a radially inward end to a radially outward end thereof.

16. The blade assembly of claim 9, wherein the cross member seal is disposed between the leg slots.

* * * * *